United States Patent
Varnhorn et al.

(10) Patent No.: US 7,943,694 B2
(45) Date of Patent: May 17, 2011

(54) CROSSLINKABLE COMPOSITIONS, THERMOPLASTIC ELASTOMERS OBTAINABLE THEREFROM AND THEIR USE

(75) Inventors: Kay Varnhorn, Monheim am Rhein (DE); Jörg Mertinkat, Rosenheim (DE)

(73) Assignee: LANXESS Deutschland GmbH, Leverkusen (DE)

(*) Notice: Subject to any disclaimer, the term of this patent is extended or adjusted under 35 U.S.C. 154(b) by 0 days.

(21) Appl. No.: 12/394,666

(22) Filed: Feb. 27, 2009

(65) Prior Publication Data

US 2009/0227725 A1 Sep. 10, 2009

(30) Foreign Application Priority Data

Mar. 4, 2008 (DE) .......... 10 2008 012 516
Aug. 18, 2008 (DE) .......... 10 2008 038 280

(51) Int. Cl.
C08F 283/02 (2006.01)
C08L 53/00 (2006.01)
(52) U.S. Cl. .................. 524/513; 524/505
(58) Field of Classification Search .......... 524/513
See application file for complete search history.

(56) References Cited

U.S. PATENT DOCUMENTS

| 4,322,575 A * | 3/1982 | Skipper ............ 174/120 SR |
| 4,937,303 A | 6/1990 | Wolf et al. ............. 526/212 |
| 4,981,908 A | 1/1991 | Wolfe, Jr. ................. 525/92 |
| 5,135,988 A | 8/1992 | Meurer et al. ............ 525/302 |
| 5,914,386 A | 6/1999 | Berendse et al. ......... 528/272 |
| 2007/0232715 A1 | 10/2007 | Hoffmann et al. ........ 522/110 |
| 2008/0021164 A1 | 1/2008 | Masuda et al. .......... 525/190 |
| 2008/0161438 A1 * | 7/2008 | Wang et al. ............. 521/137 |

FOREIGN PATENT DOCUMENTS

| DE | 41 23 963 | 1/1993 |
| DE | 44 25 944 | 1/1996 |
| DE | 100 17 149 | 11/2000 |
| EP | 0 510 478 | 10/1992 |
| WO | 01/04174 | 1/2001 |

OTHER PUBLICATIONS

Encyclopedia of Polymer Science, vol. 12 (1988), pp. 75 ff; "Polyesters, Aromatic".
European Search Report from 09153852.0 dated Jun. 9, 2009—5 pages.

* cited by examiner

Primary Examiner — Ling-Siu Choi
Assistant Examiner — Hui Chin
(74) Attorney, Agent, or Firm — Michael A. Miller

(57) ABSTRACT

Crosslinkable compositions based on at least one copolyester as thermoplastic elastomer and on α-olefin-vinyl acetate copolymers having a vinyl acetate content of $\geq 40\%$ by weight, where the compositions comprise a peroxide as crosslinking initiator. The present invention further relates to the preparation of the crosslinkable compositions of the invention, to the use of the crosslinkable compositions of the invention for the production of thermoplastic elastomers, to a process for the crosslinking of the compositions of the invention to give a thermoplastic elastomer of the invention, and also to the thermoplastic elastomers of the invention themselves and to their use for the production of mouldings.

25 Claims, No Drawings

CROSSLINKABLE COMPOSITIONS, THERMOPLASTIC ELASTOMERS OBTAINABLE THEREFROM AND THEIR USE

FIELD OF THE INVENTION

The present invention relates to crosslinkable compositions based on copolyesters as thermoplastic elastomers and on α-olefin-vinyl acetate copolymers having a vinyl acetate content of ≧40% by weight, where the compositions comprise a peroxide as crosslinking initiator. The present invention further relates to the preparation of the crosslinkable compositions of the invention, to the use of the crosslinkable compositions of the invention for the production of thermoplastic elastomers, to a process for the crosslinking of the compositions of the invention to give a thermoplastic elastomer of the invention, and also to the thermoplastic elastomers of the invention themselves and to their use for the production of mouldings.

BACKGROUND OF THE INVENTION

In plastics technology, a distinction is traditionally made between three significant classes of materials, namely thermoplastics, elastomers and thermosets. In recent years, a further class of materials, the thermoplastic elastomers, has continually found new applications. Thermoplastic elastomers combine the processing properties of thermoplastics with the service properties of elastomers. The person skilled in the art is aware of various classes of these thermoplastic elastomers. A distinction can be made between two main classes, namely block copolymers (also multiblock copolymers) and elastomer alloys.

The block copolymers are composed of a hard phase and of a soft, elastic phase. The soft phases mostly form the matrix while the hard phases provide a disperse phase which acts like a crosslinking/reinforcing filler. The crosslinking regions are formed via physical bonds between the hard segments. Within their service temperatures, the block copolymers behave like crosslinked elastomers, as long as the transition temperature of the hard segments is markedly above, and that of the soft segments is markedly below, the service temperature, and the fractions in the mixture also have the correct ratio to one another.

Elastomer alloys are polymer blends which comprise thermoplastic fractions and elastomer fractions. They are produced via intensive mixing of the starting components, and crosslinking agents can be added here. If the soft phase is (to some extent) crosslinked, the term used is thermoplastic vulcanisates (TPE-V). If the soft phase has not been crosslinked, the term used if TPE-O.

The present invention relates to thermoplastic elastomers of TPE-V type. The thermoplastic used here comprises at least one copolyester as thermoplastic elastomer.

TPE-V which have copolyesters are known in the prior art.

EP 1 767 577 A1 relates to the thermoplastic elastomer compositions which have from 20 to 95% by weight of a polyester (A) with a melt flow rate of from 4 g/10 min to <20 g/10 min, and from 80 to 5% by weight of at least one rubber (B) selected from acrylate rubber (B1), hydrogenated nitrile rubber (B2) and polyether rubber (B3), where the rubber (B) has been dynamically crosslinked. The thermoplastic elastomers according to EP 1 767 577 A1 are intended, according to EP 1 767 577 A1, to feature good tensile strength properties, low compression set and superior fatigue properties. From the examples it is apparent that in particular the melt flow rate of the polyester (A) is essential for obtaining thermoplastic elastomers with advantageous properties, composed of the components according to EP 1 767 577 A1. EP 1 767 577 A1 does not disclose thermoplastic elastomers which comprise, as rubber component, specific α-olefin-vinyl acetate copolymers with vinyl acetate content ≧40% by weight EP 0 327 010 A2 relates to thermoplastic compositions which comprise from 20 to 99 parts by weight of a thermoplastic multiblock copolyester elastomer which melts above 100° C., and from 1 to 80 parts by weight of a polyacrylate elastomer. The compositions according to EP 0 327 010 A2 are intended to be soft, elastomeric, thermoplastic materials which have a low degree of swelling in oil and a low compression set. EP0 327 010 A2 does not disclose thermoplastic elastomers which comprise α-olefin-vinyl acetate copolymers with vinyl acetate content of ≧40% by weight.

DE 44 25 944 A1 relates to thermoplastic elastomer compositions comprising (I) from 5 to 60% by weight of one or more thermoplastics selected from the group consisting of polycarbonate, polystyrene-acrylonitrile, polymethyl methacrylate, polyoxymethylene, polybutylene terephthalate, polyamide and polyvinyl chloride, and (II) from 40 to 95% by weight of a crosslinked ethylene-vinyl ester copolymer, obtainable via emulsion polymerization of ethylene and of vinyl ester monomers with polyethylenically unsaturated comonomers and, if appropriate, subsequent graft copolymerization. The advantage of the thermoplastic elastomer compositions according to DE 44 25 944 A1 is, according to the disclosure in DE 44 25 944 A1, that thermoplastic elastomers are provided which are produced via thermomechanical mixing, without any additional crosslinking step, and/or comminution step, and these have a thermomechanically stable, well defined elastomer phase structure, and good mechanical properties with improved elastic properties, at relatively high temperatures. DE 44 25 944 A1 does not mention thermoplastic elastomers in which α-olefin-vinyl acetate copolymers are dynamically crosslinked in the presence of the thermoplastic used. According to DE 44 25 944 A1, dynamic crosslinking is intended to be specifically avoided.

DE 100 17 149 A1 relates to thermoplastic elastomer compositions, encompassing (i) from 30 to 90 parts by weight of a thermoplastic resin material, which comprises at least one type of thermoplastic copolyester elastomer, and (ii) from 10 to 70 parts by weight of a rubber material, which comprises a rubber comprising an ethylene constituent. The thermoplastic polyester elastomer has a hard segment and a soft segment, and the molar ratio of a polyol moiety in the hard segment to a polyol moiety in the soft segment is 1:1.5 to less than 4.0. The thermoplastic elastomer compositions according to DE 100 17 149 A1 are intended to be suitable for joint sleeves with improved flexibility, improved compression set and improved low-temperature properties, with no impairment of the excellent mechanical properties, heat resistance and oil resistance of a thermoplastic elastomer composition. The thermoplastic elastomer compositions can comprise, as rubber comprising an ethylene constituent, an ethylene-propylene copolymer rubber, ethylene-propylene-diene copolymer rubber, ethylene-acrylate copolymer rubber, ethylene-ethyl acrylate copolymer rubber, chlorosulphonated polyethylene, chlorinated polyethylene or an ethylene-vinyl acetate copolymer rubber (EVA). The rubber material can, according to DE 100 17 149 A1, be an uncrosslinked or at least partially crosslinked material. DE 100 17 149 A1 gives an example of a thermoplastic elastomer composition which comprises, as rubber mixture, EVA and a thermoplastic copolyester elastomer, composed of dimethyl terephthalate, 1,4-butanediol and polytetramethylene glycol. The mixture comprises a proportion of 40 parts by weight of the rubber mixture and a proportion of 60 parts by weight of the thermoplastic copolyester elastomer. The rubber mixture was crosslinked using 0.5 part by weight (based on 100 parts by weight of the rubber mixture) of sulphur powder. DE 100 17 149 A1 does not disclose compositions which comprise, alongside a copolyester, α-olefin-vinyl acetate copolymers with vinyl acetate content of ≧40% by weight, where additionally at least one peroxide is present as free-radical crosslinking initiator and the proportion of the copolyester (thermoplastic polymer) is from 5 to 50% by weight.

It is an object of the present invention, in the light of the thermoplastic elastomers known in the prior art, to provide thermoplastic elastomers which feature a rubber-like property profile. This means that the intention is to provide thermoplastic elastomers, and compositions for the production of thermoplastic elastomers, where these have very good recovery properties, good tension set, good compression set, very good heat resistance values and solvent resistance values, and a low range of hardness (Shore hardness A). The thermoplastic elastomers are intended to be capable of processing via any desired processing techniques, such as extrusion, injection moulding, and also blow moulding.

None of the thermoplastic elastomers known hitherto can achieve a combination of properties comprising low hardness, good elastic properties, and rapid recovery together with solvent resistance and heat resistance. The thermoplastic elastomers known hitherto can either achieve good elastic properties or good heat resistance values, but with unsatisfactory solvent resistance values (in particular long-term solvent resistance values), or can achieve good solvent resistance values, but with unsatisfactory heat resistance values. Thermoplastic elastomers which have high heat resistance values and good solvent resistance values, such as TPE-A (polyetheramides), TPE-E (polyetheresters) and TPE-U (TPU, polyurethanes) are available only for applications in the (high) Shore D hardness range, in a high price segment, and have moderate elastic properties. None of the materials known hitherto in the thermoplastic elastomers (thermoplastic vulcanisates) class, TPE-V, has hitherto been capable of complying with the abovementioned requirements profile.

SUMMARY OF THE INVENTION

The object is achieved via provision of crosslinkable compositions comprising
a) from 5 to 90% by weight, preferably from 8 to 85% by weight, particularly preferably from 10 to 80% by weight, very particularly preferably from 10 to 40% by weight, with very particular preference from 10 to <30% by weight, of at least one copolyester as thermoplastic elastomer, as component A;
b) from 10 to 95% by weight, preferably from 14.5 to 91.5% by weight, particularly preferably from 19.5 to 89.5% by weight, very particularly preferably from 40 to 89.5% by weight, with very particular preference from >55 to 85% by weight, of at least one α-olefin-vinyl acetate copolymer having a vinyl acetate content of ≧40% by weight, preferably ≧50% by weight, as component B;
c) from 0 to 30% by weight, preferably from 0.5 to 28% by weight, particularly preferably from 0.5 to 25% by weight, very particularly preferably from 0.5 to 20% by weight, with very particular preference from 5 to 15% by weight, of filler materials, plasticizers, additives and/or additions, as component C;

where the entirety of components A, B and C is 100% by weight,
and
d) from 0.1 to 15 parts by weight per 100 parts by weight of the α-olefin-vinyl acetate copolymer (phr), preferably from 0.2 to 10 phr, particularly preferably from 0.5 to 7 phr, of at least one peroxide as free-radical crosslinking initiator, as component D.

DETAILED DESCRIPTION OF THE INVENTION

The compositions of the invention are suitable for the production of thermoplastic elastomers which feature not only excellent heat resistance and excellent solvent resistance but in particular also very good elastic properties, with a wide range of hardness.

Particularly suitable compositions of the invention have, for example, <15% swelling on storage in engine oil for 24 h, no change in tensile strain properties after storage for 168 h in hot air at 150° C., and a hardness range (Shore A hardness) of from 60 to 90 ShA (suitable test methods being mentioned in the examples below).

The compositions in particular achieve this in that α-olefin-vinyl acetate copolymers having a high vinyl acetate content of ≧40% by weight, preferably ≧50% by weight, are used as component B, and are dynamically crosslinked by means of peroxides as crosslinking initiators.

Thermoplastic elastomers produced from the compositions of the invention can be processed by means of extrusion, or injection moulding, or else by means of blow moulding.

Component A: at Least One Copolyester as Thermoplastic Elastomer

The amount used of the thermoplastic elastomer in the crosslinkable compositions of the invention is from 5 to 90% by weight, preferably from 8 to 85% by weight, particularly preferably from 10 to 80% by weight, very particularly preferably from 10 to 40% by weight, with very particular preference from 10 to <30% by weight, based on the entirety of components A and B (at least one α-olefin-vinyl acetate copolymer) and C (filler materials, plasticizers, additives and/or additions).

Copolyesters suitable as component A are known to the persons skilled in the art. Suitable copolyesters are generally copolyesters in the form of copolymers which have, in the main chain of the polymer, monomer units bonded by way of ester groups (—C(=O)—O—).

Copolyesters in the form of copolymers are preferably multiblock copolyesters, composed of hard blocks (X) and of soft blocks (Y). Suitable monomer components for the construction of hard blocks (X) and of soft blocks (Y) in multiblock copolyesters are known to the person skilled in the art and are disclosed by way of example in Encyclopedia of Polymer Science and Engineering, Vol. 12, page 75 ff. (1988), and in the references therein. In one preferred embodiment, the hard blocks (X) of the multiblock copolyester are based on aliphatic diols and on aromatic dicarboxylic acids. Suitable aliphatic diols and aromatic dicarboxylic acids are known to the person skilled in the art, and preferred aliphatic diols and aromatic dicarboxylic acids are mentioned below.

The soft blocks (Y) are preferably based on
(i) at least one poly(alkylene oxide) glycol, and/or
(ii) aliphatic diols and aliphatic dicarboxylic acids; and/or
(iii) a triblock copolymer comprising an unhydrogenated or hydrogenated polyalkadiene block and two polyalkylene oxide blocks; and/or
(iv) an aliphatic carbonate and, if appropriate, an aliphatic diol and an aliphatic carboxylic acid; or a lactone.

The blocks (X) and (Y) usually have linkage by way of difunctional compounds according to the method known to the person skilled in the art. As an alternative to, or in a mixture with, the abovementioned dicarboxylic acids it is possible to use the corresponding dicarboxylic esters.

Examples of diols suitable for the preparation of the copolyesters used according to the invention are ethylene glycol, diethylene glycol, triethylene glycol, propylene glycol, butylene glycol, trimethylene glycol and cyclohexanedimethanol.

Examples of suitable aromatic dicarboxylic acids or dicarboxylic esters are phthalic acid, terephthalic acid or isophthalic acid, and the corresponding esters thereof.

Suitable aliphatic dicarboxylic acids or esters thereof are fumaric acid, adipic acid or the corresponding esters.

Examples of poly(alkylene oxide) glycols used in the soft blocks (Y) according to (i) are $C_2$-$C_{10}$ poly(alkylene oxide) glycols, preferably poly(butylene oxide) glycol, poly(hexamethylene oxide) glycol, or copolymers of the alkylene oxides mentioned, e.g. copolymers composed of ethylene oxide and propylene oxide.

Examples of triblock copolymers used as soft blocks (Y) according to (iii) are the triblock copolymers disclosed in WO 01/04174.

Suitable soft blocks (Y) according to (iv) are the soft blocks mentioned in U.S. Pat. No. 5,914,386.

The soft blocks (Y) used are preferably soft blocks based on at least one poly(alkylene oxide) glycol. In one preferred embodiment, the polyester is therefore a multiblock copolyester composed of hard blocks (X), based on aliphatic diols selected from the group consisting of ethylene glycol, diethylene glycol, triethylene glycol, propylene glycol, butylene glycol, trimethylene glycol and cyclohexanedimethanol, preferably butylene glycol, and on aromatic dicarboxylic acids, or their esters, selected from the group consisting of phthalic acid, terephthalic acid and isophthalic acid, preferably terephthalic acid, and of soft blocks (Y) based on at least one poly(alkylene oxide) glycol, where the poly(alkylene oxide) glycol is composed of $C_2$-$C_{10}$ poly(alkylene oxide) glycols, preferably poly(ethylene oxide) glycol, poly(propylene oxide) glycol, poly(butylene oxide) glycol, poly(hexamethylene oxide) glycol, or on copolymers of the alkylene oxides mentioned, e.g. on copolymers composed of ethylene oxide and of propylene oxide.

The copolyesters preferably used according to the invention have melting points or softening points which are generally from 160 to 300° C., preferably from 165 to 270° C., particularly preferably from 170 to 220° C.

Component A in the crosslinkable compositions of the invention can involve a single thermoplastic elastomer or can involve a mixture of various thermoplastic elastomers. It is conceivable here, by way of example, that various copolyesters are used. However, it is also conceivable that, for example, a copolyester is mixed with other thermoplastic elastomers.

The copolyesters suitable as component A in the compositions of the invention can be prepared by the process known to the person skilled in the art, or are available commercially. Examples of suitable commercially available copolyesters are the Arnitel® grades from Royal DSM or the Hytrel® grades from DuPont.

Component B (α-Olefin-Vinyl Acetate Copolymer)

The amount used of the α-olefin-vinyl acetate copolymer (component B) in the crosslinkable compositions of the invention is from 10 to 95% by weight, preferably from 14.5 to 91.5% by weight, particularly preferably from 19.5 to 89.5% by weight, very particularly preferably from 40 to 89.5% by weight, with particular preference from >55 to 85% by weight, based on the entirety of components A, B and C.

The α-olefin-vinyl acetate copolymers used as component B can generally have vinyl acetate contents of from 20 to 98% by weight.

The α-olefin-vinyl acetate copolymers used with preference according to the invention feature high vinyl acetate contents of ≧40% by weight, based on the total weight of the α-olefin-vinyl acetate copolymer, preferably vinyl acetate contents of ≧50% by weight, based in each case on the total weight of the α-olefin-vinyl acetate copolymers. It is usual that the vinyl acetate content of the α-olefin-vinyl acetate copolymers used according to the invention is from ≧40% by weight to 98% by weight, preferably from ≧50% by weight to 98% by weight, and that the α-olefin content is from 2% by weight to ≦60% by weight, preferably from 2% by weight to ≦50% by weight, where the total amount of vinyl acetate and α-olefin is 100% by weight.

The α-olefin-vinyl acetate copolymer used according to the invention can comprise not only the monomer units based on the α-olefin and on vinyl acetate, but also one or more further comonomer units (e.g. terpolymers), e.g. based on vinyl esters and/or on (meth)acrylates. The proportion of the further comonomer units—if indeed further comonomer units are present in the α-olefin-vinyl acetate copolymer—is up to 10% by weight, based on the total weight of the α-olefin-vinyl acetate copolymer, whereupon the proportion of the monomer units based on the α-olefin decreases correspondingly. It is therefore possible by way of example to use α-olefin-vinyl acetate copolymers which are composed of from ≧40% by weight to 98% by weight of vinyl acetate, from 2% by weight to ≦60% by weight of α-olefin, and from 0 to 10% by weight of at least one further comonomer, where the total amount of vinyl acetate, α-olefin and the further comonomer is 100% by weight.

α-Olefins that can be used in the α-olefin-vinyl acetate copolymers used according to the invention are any of the known α-olefins. It is preferable that the α-olefin has been selected from ethene, propene, butene, in particular n-butene and isobutene, pentene, hexene, in particular 1-hexene, heptene, in particular 1-heptene, and octene, in particular 1-octene. It is also possible to use higher homologues of the α-olefins mentioned as α-olefins in the α-olefin-vinyl acetate copolymers used according to the invention. The α-olefins can moreover bear substituents, in particular $C_1$-$C_5$-alkyl moieties. However, it is preferable that the α-olefins bear no further substituents. It is moreover possible to use mixtures of two or more different α-olefins in the α-olefin-vinyl acetate copolymers used according to the invention. However, it is preferable not to use mixtures of different α-olefins. Preferred α-olefins are ethene and propene, and it is particularly preferable here to use ethene as α-olefin in the α-olefin-vinyl acetate copolymers used according to the invention. The α-olefin-vinyl acetate copolymer preferably used in the crosslinkable compositions of the invention therefore involves an ethylene-vinyl acetate copolymer.

Particularly preferred ethylene-vinyl acetate copolymers have a vinyl acetate content of from ≧40% by weight to 98% by weight, preferably from ≧50% by weight to 98% by weight, and an ethylene content of from 2% by weight to ≦60% by weight, preferably from 2% by weight to ≦50% by weight, where the entirety of vinyl acetate and ethylene is 100% by weight.

The α-olefin-vinyl acetate copolymer used according to the invention, preferably ethylene-vinyl acetate copolymer, is preferably prepared by a solution polymerization process at a pressure of from 100 to 700 bar, preferably at a pressure of 100 to 400 bar. The solution polymerization process is preferably carried out at temperatures of from 50 to 150° C., generally using free-radical initiators.

The ethylene-vinyl acetate copolymers preferably used according to the invention and having high vinyl acetate contents are usually terms EVM copolymers, where the "M" in the name indicates the saturated main methylene chain of the EVM.

Suitable preparation processes for the α-olefin-vinyl acetate copolymers used according to the invention are mentioned by way of example in EP-A-0 341 499, EP-A 0 510 478 and DE-A 38 25 450.

The α-olefin-vinyl acetate copolymers which are used with preference according to the invention and have high vinyl acetate contents, and are prepared by the solution polymerization process at a pressure of from 100 to 700 bar in particular feature low degrees of branching and low viscosities. The α-olefin-vinyl acetate copolymers used according to the invention moreover have a uniformly random distribution of their units α-olefin and vinyl acetate).

The MFI values (g/10 min), measured to ISO 1133 at 190° C. using a load of 21.1 N, of the α-olefin-vinyl acetate copolymers used according to the invention, preferably ethylene-vinyl acetate copolymers, is generally from 1 to 40, preferably from 1 to 10, particularly preferably from 2 to 6.

The Mooney viscosities to DIN 53 523 mL 1+4 at 100° C. are generally from 3 to 50, preferably from 4 to 35, Mooney units.

It is particularly preferable that the crosslinkable compositions according to the invention use ethylene-vinyl acetate copolymers, where these are by way of example obtainable with trade mark Levapren® or Levamelt® from Lanxess Deutschland GmbH.

α-Olefin copolymers whose use is particularly preferred are the ethylene-vinyl acetate copolymers Levamelt® 400, Levamelt® 450, Levamelt® 452, Levamelt® 456, Levamelt® 500, Levamelt® 600, Levamelt® 700, Levamelt® 800 and Levamelt® 900, having 60±1.5% by weight of vinyl acetate, 70±1.5% by weight of vinyl acetate, 80±2% by weight of vinyl acetate and, respectively, 90±2% by weight of vinyl acetate, and the corresponding Levapren® grades.

Component B used in the crosslinkable compositions of the invention can comprise one α-olefin-vinyl acetate copolymer, but it is likewise possible to use mixtures composed of two or more α-olefin-vinyl acetate copolymers.

Component C (Filler Materials, Plasticizers, Additives and/or Additions)

The crosslinkable compositions of the invention can comprise from 0 to 40% by weight, preferably from 0.5 to 30% by weight, particularly preferably from 5 to 20% by weight, based on the entirety of components A, B and C, of filler materials, plasticizers, additives and/or additions, as component C.

In principle, the person skilled in the art is aware of suitable filler materials, plasticizers, additives and/or additions. Examples of suitable filler materials, plasticizers, additives and additions are mentioned below:

Filler Materials (Fillers)

Examples of suitable filler materials are carbon black, chalk (calcium carbonate), kaolin, siliceous earth, talc (magnesium silicate), aluminium oxide hydrate, aluminium silicate, calcium carbonate, magnesium carbonate, calcium silicate, magnesium silicate, barium sulphate, zinc carbonate, calcined kaolin (e.g. Polestar® 200 P), calcium oxide, magnesium oxide, titanium oxide, aluminium oxide, zinc oxide, silanized kaolins, silanized silicate, coated chalk, treated kaolins, fumed silica, hydrophobicized fumed silica (e.g. Aerosil® 972), synthetic, amorphous precipitated silica, industrial carbon black, graphite, nanoscale fillers, such as carbon nanofibrills, lamellar nanoparticles, or nanoscale silicon dioxide hydrates and minerals.

Plasticizers

Examples of suitable plasticizers are ester plasticizers, e.g. phthalic esters, such as dioctyl phthalate, diisooctyl phthalate, dinonyl phthalate, diisodecyl phthalate; aliphatic esters, such as dioctyl adipate, dioctyl sebacate; phosphoric esters, such as tricresyl phosphate, diphenyl cresyl esters, trioctyl phosphate; polyesters, such as polyphthalic esters, polyadipic esters, polyesterethers (e.g. ADK Cizer RZ-700, ADK Cizer RZ-750) and trimellitates (e.g. BISOFLEX® T810T).

Additives and Additions

Examples of suitable additives and additions are processing aids, metal soaps, fatty acids and fatty acid derivatives, factice (rubbery substance obtained for example by treating drying oils with sulphur or sulphur chloride; serves as rubber extender load), ageing stabilizers, UV stabilizers or ozone stabilizers, such as ozone-stabilizer waxes, antioxidants, e.g. polycarbodiimides (e.g. Rhenogran® PCD-50), substituted phenols, substituted bisphenols, dihydroquinolines, diphenylamines, phenylnaphthylamines, paraphenylenediamines, benzimidazoles, paraffin waxes, microcrystalline waxes, pigments and dyes, such as titanium dioxide, lithopones, zinc oxide, iron oxide, ultramarine blue, chromium oxide, antimony sulphide; other stabilizers, e.g. heat stabilizers, weathering stabilizers; oxidation stabilizers, e.g. p-dicumyldiphenylamine (e.g. Naugard® 445), styrenated diphenylamine (e.g. Vulcanox® DAA), zinc salt of methylmercapobenzimidazole (e.g. Vulcanox® ZMB2), polymerized 1,2-dihydro-2,2,4-trimethylquinoline (e.g. Vulcanox® HS), thiodiethylene bis(3,5-di-tert-buty-4-hydroxy)hydrocinamate, thiodiethylene bis[3-(3,5-di-tert-butyl-4-hydroxyphenyl)propionate] (e.g. Irganox® 1035), lubricants, mould-release agents, flame retardants, adhesion promoters, marking substances, minerals, and crystallization accelerators and crystallization retardants.

Component D (Free-Radical Crosslinking Initiator)

The crosslinkable compositions of the invention moreover comprise from 0.2 to 10 parts by weight per 100 parts by weight of the α-olefin-vinyl acetate copolymer (component B) (phr), preferably from 1 to 6 phr, particularly preferably from 1.5 to 6 phr, of at least one peroxide as free-radical crosslinking initiator, as component D.

For free-radical crosslinking which provides the desired elastomeric properties of the thermoplastic elastomers obtainable from the compositions of the invention, preference is given to ethylene-vinyl acetate copolymers which have been crosslinked to some extent or completely. Thermoplastic elastomers of the invention with particularly good elastomer properties are therefore obtained when the abovementioned amounts of peroxides are used as free-radical crosslinking initiators.

The person skilled in the art is aware of peroxide suitable as free-radical crosslinking initiators. Examples are organic peroxides, e.g. alkyl and aryl peroxides, alkyl peresters, aryl peresters, diacyl peroxides, polyvalent peroxides, such as 2,5-dimethyl-2,5-di(tert-butylperoxy)hex-3-yne, (e.g. Trigonox® 145-E85, Trigonox® 145-45B), di-tert-butyl peroxide, (e.g. Trigonox® B), 2,5-dimethyl-2,5-di(tert-butylperoxy)hexyne, (e.g. Trigonox® 101), tert-butyl cumyl peroxide (e.g. Trigonox® T), di(tert-butylperoxyisopropyl)benzene (e.g. Perkadox® 14-40), dicumyl peroxide (e.g. Perkadox® BC 40), benzoyl peroxide, 2,2'-bis(tert-butylperoxy)diisopropylbenzene (e.g. Vulcup® 40 AE), 2,3,5-(tri)methyl-2,5-di(benzoylperoxy)hexane and (2,5-bis(tert-butylperoxy)-2,5-dimethylhexane, 3,3,5,7,7-pentamethyl-1,2,4-trioxepane (e.g. Trigonox® 311).

One important property of free-radical crosslinking initiators, particularly of crosslinking peroxides, is the generation of free radicals, this property generally being described via the half life time [t ½]. The half life time is the time at which, at a certain temperature, the concentration of a free-radical crosslinking initiator present is 50% of the initial concentration.

The half life times are determined by way of the vulcanization curves. The half life time becomes shorter as temperature rises. It is preferable to use peroxides whose half life time above the melting or softening point of component A is sufficiently long that they retain capability for homogeneous incorporation into the polymer melt. It is preferable to use peroxides whose half life time is below the residence time in the corresponding mixing assembly, in order that all of the free radicals generated can be consumed for the crosslinking reaction.

Because of the high melting or softening point of the polyamide used according to the invention as component A, the crosslinking of the elastomer phase for the production of the thermoplastic elastomers obtainable from the compositions of the invention takes place in an appropriately hot melt. This demands—in one preferred embodiment—the use of free-radical crosslinking initiators, preferably peroxides, with sufficiently long half life time. Free-radical crosslinking initiators, preferably peroxides, with short half life times at low temperatures decompose on first contact with the polymer melt and are not incorporated homogeneously, and give inadequate or inhomogeneous crosslinking of the elastomer phase. It is therefore particularly preferable according to the invention to use free-radical crosslinking initiators, preferably peroxides, which have adequately long half life times at $\geq 175°$ C., particularly preferably $\geq 180°$ C., very particularly preferably $\geq 185°$ C., with particular preference $\geq 190°$ C. and more particularly preferably $\geq 200°$ C. It is particularly preferable to use 3,3,5,7,7-pentamethyl-1,2,4-trioxepane, obtainable commercially for example with trade name Trigonox® 311, in the crosslinkable compositions of the invention.

Component E (Co-Crosslinking Agent)

In one preferred embodiment, the compositions of the invention moreover also comprise at least one co-crosslinking agent as component E. The amount used of the co-crosslinking agent in the compositions of the invention is generally from 0 to 10 parts by weight per 100 parts by weight of the α-olefin-vinyl acetate copolymer (phr), preferably from 1 to 6 phr.

Surprisingly, it has been found that the elastic properties, in particular the compression set, of thermoplastic elastomers which are produced from the crosslinkable compositions of the invention can be improved via addition of a co-crosslinking agent within the crosslinkable compositions without impairment of the abovementioned elastic properties and of the heat resistance and solvent resistance value. The compression set, in particular, can be substantially improved via addition of a co-crosslinking agent within the crosslinkable compositions of the invention, within the industrially relevant range. The prior art gives no indication that the use of a co-crosslinking agent in crosslinkable compositions according to the present invention can achieve an improvement in the elastic properties, in particular in the compression set. Addition of a co-crosslinking agent can moreover reduce the amount of crosslinking agent in comparison with the amount usually used of crosslinking agent, without any impairment of the property profile of the products obtained.

Examples of suitable co-crosslinking agents are those selected from the group consisting of triallyl isocyanurate (TAIC) (e.g. DIAK7 from DuPont), N,N'-m-phenylenedimaleimide (e.g. HVA-2® from DuPont Dow), triallyl cyanurate (TAC), liquid polybutadiene (e.g. Ricon® D153 from Ricon Resins), trimethylolpropane-N,N'-m-phenylenemaleimide, N-methyl-N,N'-m-phenylenedimaleimide, divinylbenzene, polyfunctional methacrylate monomers, such as ethylene glycol dimethacrylate, diethylene glycol dimethacrylate, polyethylene glycol dimethacrylate, trimethylolpropane trimethacrylate and allyl methacrylate, and polyfunctional vinyl monomers, such as vinyl butyrate and vinyl stearate.

Co-crosslinking agents whose use is preferred are those selected from the group consisting of triallyl isocyanurate (TAIC), N,N'-m-phenylenedimaleimide, triallyl cyanurate (TAC) and liquid polybutadiene. It is particularly preferable to use triallyl isocyanurate (TAIC) as co-crosslinking agent.

It is possible to use one co-crosslinking agent or two or more co-crosslinking agents together in the crosslinkable compositions of the invention.

Component F (Compatibilizer)

The crosslinkable compositions of the invention can also comprise at least one compatibilizer as component F, alongside the abovementioned components A to E, of which some are optional. The compatibilizer generally improves the coupling of the α-olefin-vinyl acetate copolymer (component B) to the thermoplastic polymer (component A). The person skilled in the art is in principle aware of suitable compatibilizers. By way of example, functionalized polyolefins and, respectively, olefin copolymers are suitable compatibilizers. Suitable functional groups of the functionalized polyolefins or polyolefin copolymers are carboxy groups, carbonyl groups, halogen atoms, amino groups, hydroxy groups or oxazoline groups. It is preferable that the polyolefins are polyolefin copolymers have been functionalized with carboxy groups. Production processes for suitable polyolefins functionalized with carboxy groups are disclosed by way of example in DE 41 23 963 and in the references mentioned therein.

It is preferable that the compatibilizer in the compositions according to the present invention is a copolymer based on an α-olefin-vinyl acetate copolymer as main polymer chain, functionalized with carboxy groups, carbonyl groups, halogen atoms, amino groups, hydroxy groups or oxazoline groups, preferably with carboxy groups. The compositions of the invention particularly preferably use a compatibilizer which is obtained by means of grafting of α,β-ethylenically unsaturated mono- and/or dicarboxylic acids or their derivatives onto a main polymer chain provided by an α-olefin-vinyl acetate copolymer. Suitable processes for the preparation of the particularly preferred compatibilizer are known to the person skilled in the art and mentioned by way of example in EP 1 801 162 A1. The compositions of the invention have particularly good oil-swelling behaviour when α-olefin-vinyl acetate copolymers, in particular ethylene-vinyl acetate copolymers, particularly preferably EVM having high vinyl acetate contents, generally $\geq 60\%$ by weight, are grafted.

The amount used of the abovementioned compatibilizer in the crosslinkable compositions of the invention, if indeed it is present at all, is from 0 to 50% by weight, based on the entirety of components A, B and C, preferably from 3 to 40% by weight, particularly preferably from 5 to 30% by weight.

Preparation of the Crosslinkable Compositions of the Invention and Crosslinking to Give Thermoplastic Elastomers (TPE-V)

The crosslinkable compositions of the invention can be prepared via mixing of components A, B, C, D, E and F—to the extent that they are present in the compositions. The mixing process here can use mixing systems known in rubber technology, examples being internal mixers, e.g. internal mixers with intermeshing or tangential rotor geometry, or continuous mixing systems, such as mixing extruders, e.g. mixing extruders having from 2 to 4 screws.

In carrying out the process of the invention, it is important to ensure that the mixing temperature is sufficiently high that component A is converted to the plastics state without being damaged. This is ensured if the temperature selected is above the highest melting or softening point of component A. It is particularly preferable that components A, B, C, D, E and F—to the extent that they are present in the compositions—are mixed at a temperature in the range which is generally from 150 to 350° C., preferably from 150 to 280° C.

Various variants are in principle possible for the mixing of the individual components.

In one first variant, components A and B, and, if appropriate, components C and F, to the extent that they are present in the compositions of the invention, are used as initial charge and intimately mixed at temperatures above the highest melting or softening point of component A. Components D and E (to the extent that component E is present in the compositions of the invention) are then added, with continuation of the mixing process and retention of the abovementioned mixing temperature.

In a second embodiment of the process of the invention, component B is used as initial charge and heated to a temperature up to just below the melting or softening point of component A. Component A is then added, and the temperature is increased to a temperature above the highest melting or softening point of component A, and only after components B and A, if appropriate together with components C and F, if these components are present, have been intimately mixed are components D, and if appropriate, E (if component E is present) added, with continuation of the mixing process, and with retention of the mixing temperature above the highest melting or softening point of component A.

In a third variant, component A is used as initial charge and heated to a temperature above the highest melting or softening point of component A, and then component B is added and components A and B are intimately mixed, if appropriate together with components C and F, if these are present. Components D, and if appropriate, E (if component E is present) are then added, with continuation of the mixing process and with retention of the mixing temperature above the highest melting or softening point of component A.

In a fourth variant, all of components A, B, C, D, E, and, if appropriate, F—to the extent that the components are present in the compositions—can be used simultaneously as initial charge at a temperature above the highest melting or softening point of the thermoplastic polymer(s), and can then be intimately mixed.

Particularly good distribution of elastomer component B in the thermoplastic component A is achieved when the process is carried out according to a fifth, particularly preferred, variant. In this, component B is first mixed with components D and, if appropriate, E (to the extent that component E is present), at a temperature below the highest melting or softening point of component A. The temperature below the highest melting or softening point of component A depends on the component A used. It is preferable that the temperature below the highest melting or softening point of component A is from 30 to 180° C., particularly preferably from 50 to 150° C. The mixture obtained is then added to a mixture of component A with components C and F—to the extent that components C and F are present in the compositions of the invention—where these have been heated to a temperature above the highest melting or softening point of component A. All of the components are then intimately mixed at a temperature above the highest melting or softening point of component A.

The abovementioned variants of the process, in particular variant 5 of the process, maximizes the fineness and uniformity of distribution of component A and component B prior to crosslinking of the elastomer phase. A typical particle size of the elastomer particles prior to the crosslinking process is <5 µm.

The temperature mentioned above and hereinafter, above the highest melting or softening point of component A, depends on the component A used. The temperature above the highest melting or softening point of component A is preferably from 150° C. to 350° C., particularly preferably from 200° C. to 300° C.

The selection of the addition time and the temperature, form, and amount of components D and E should moreover be such as to ensure good distribution of component D and, if appropriate, E in the elastomer phase, and that the elastomer phase and thermoplastic phase are present in the state described above, and that the crosslinking of the elastomer phase takes place only thereafter, so that a phase inversion takes place, or a co-continuous phase structure of the elastomers and of the thermoplastic phase arises, and/or that the elastomer is present in dispersed form in the thermoplastic phase with particles <5 µm.

The crosslinkable compositions of the invention have excellent suitability for the provision of thermoplastic elastomers with balanced properties, in particular with very good heat resistance values and solvent resistance values, and at the same time with very good elastic properties, with a wide hardness range.

The present invention therefore also provides a process for the production of thermoplastic elastomers, encompassing the crosslinking of the compositions of the invention, or of compositions prepared according to the process of the invention. To this end, the crosslinkable compositions of the invention are subjected to a continued mixing procedure at a temperature which is above the highest melting or softening point of the component A used. Preferred temperatures above the melting or softening point of component A have been mentioned above.

According to the present invention, dynamic linking takes place. The crosslinking of the disperse elastomer phase therefore takes place during the mixing of components A to F (to the extent that these are present in the mixture). This begins when the process of the invention for the production of the crosslinkable compositions of the invention, in particular a process according to process variants 1 to 5, is continued at a temperature above the melting or softening point of component A in the presence of components D and, if appropriate, E, particularly preferably during process variant 5.

In the mixing procedure for components A, B, C, D, E and F—to the extent that these components are present—for the production of the crosslinkable composition of the invention, a point in the process is reached at which the power consumption in the mixing assembly assumes a constant value. The mixing procedure for the production of the crosslinkable composition has concluded at this juncture, and the crosslinkable composition is present. If necessary, the mixing procedure can be terminated here, and the crosslinkable compositions can be obtained by quenching, i.e. by lowering the temperature, and—if desired—can be isolated. If the mixing procedure is continued, either immediately or after interruption as described, the crosslinking process takes place via components D and, if appropriate, E, and this is discernible in an increase in the power consumption of the mixing assembly. Dynamic crosslinking of elastomeric component B is involved here.

After phase inversion or formation of a co-continuous phase, the crosslinked product obtained, i.e. the thermoplastic elastomer, is generally cooled to a temperature below the melting or softening point of the thermoplastic polymer(s).

The present invention also provides thermoplastic elastomers obtainable via crosslinking of the crosslinkable compositions of the invention. Suitable crosslinking processes for the production of the elastomers of the invention, and also suitable crosslinkable compositions, have been mentioned above.

The invention further provides thermoplastic elastomers comprising
a) from 5 to 90% by weight, preferably from 8 to 85% by weight, particularly preferably from 10 to 80% by weight, very particularly preferably from 10 to 40% by weight, with very particular preference from 10 to <30% by weight, of at least one copolyester as thermoplastic elastomer, as component A';
b) from 10 to 95% by weight, preferably from 14.5 to 91.5% by weight, particularly preferably from 19.5 to 89.5% by weight, very particularly preferably from 40 to 89.5% by weight, with very particular preference from >55 to 85% by weight, of at least one α-olefin-vinyl acetate copolymer having a vinyl acetate content of ≧40% by weight, preferably ≧50% by weight, which has been crosslinked via at least one peroxide as free-radical crosslinking initiator as component B';
c) from 0 to 30% by weight, preferably from 0.5 to 28% by weight, particularly preferably from 0.5 to 25% by weight, very particularly preferably from 0.5 to 20% by weight, with very particular preference from 5 to 15% by weight, of filler materials, plasticizers, additives and/or additions, as component C;
where the entirety of components A, B and C is 100% by weight.

A feature of the thermoplastic elastomers according to the present invention is that elastomer component B is present in finely dispersed form in the thermoplastic component A. The thermoplastic elastomers according to the present invention feature very good heat resistance and very good solvent resistance at the same time as very good elastic properties in a low hardness range (Shore hardness A). They also have excellent physical and dynamic properties, for example excellent compression set, at high temperatures markedly above 150° C., these being the temperatures especially demanded in automobile construction. Once the thermoplastic phase has melted, the entire system becomes thermoplastically processable, thus complying with the necessary preconditions for a thermoplastic elastomer.

The present invention therefore further provides the use of the compositions of the invention for the production of thermoplastic elastomers, and also the use of the thermoplastic elastomers of the invention for the production of mouldings, preferably drive belts, gaskets, sleeves, hoses, membranes, dampers, profiles, or cable sheathing, hot-melting adhesives, or foils, or for plastics-rubber coextrusion, or for co-injection-moulding.

The present invention further provides mouldings, cable sheathing, hot-melt adhesives or foils comprising the thermoplastic elastomers of the invention.

Suitable components of the crosslinkable compositions of the invention and of the thermoplastic elastomers of the invention have been mentioned above, as also have suitable preparation processes for the preparation of the crosslinkable compositions of the invention, and production processes for the production of the thermoplastic elastomers of the invention.

The mouldings obtained feature excellent physical properties, in particular excellent elasticity values with a wide hardness range, in particular in a low hardness range, and also feature resistance to high temperatures and solvent resistance, in particular oil resistance. These properties are of great importance in particular for hoses, drive belts, membranes, gaskets, bellows, cable sheathing, hot-melt adhesives, foils and sleeves, for example for automobile applications and other industrial applications. The mouldings can be way of example be produced in a simple manner in a single-stage process.

The examples below provide additional explanation of the invention.

EXAMPLES

General Process Specification for the Production of the Thermoplastic Elastomers An internal mixer from Werner and Pfleiderer with 1.5 l mixing volume is preheated to a chamber temperature of 180° C. The rubber (ethylene-vinyl acetate copolymer) and all of the additives inclusive of co-crosslinking agent—to the extent that a co-crosslinking agent is used—but with the exception of the crosslinking system, peroxide, are use as initial charge and mixed at a rotation rate of 100 rpm in the internal mixer for 1 min. The thermoplastic used in accordance with the examples below with a melting point of from 210° C. to 220° C. is now charged to the internal mixer. At a rotation rate of from 130 to 150 rpm, the temperature in the internal mixing process rises to a temperature of from 230° C. to 250° C. within a period of 2 min. This temperature is above the temperature of the melting point of the thermoplastic. The thermoplastic is fully melted. The rubber and thermoplastic components are intimately mixed in the melt by further mixing at this temperature for 3 min. The desired particle size of <5 µm, homogeneous dispersion of the two components, and a co-continuous phase morphology are achieved in this section of the mixing process. Once the 3 minutes have concluded, the crosslinking system is added. Given suitable peroxides with high crosslinking temperature, this takes place either directly or alternatively in a precompounded material, with premixing of the peroxide in a small amount of the rubber on a roll prior to addition to the internal mixer. The dynamic crosslinking of the rubber phase takes place in the internal mixer during the mixing time of 3 minutes at a temperature of from 230° C. to 250° C. at a rotation rate of 150 rpm. The contents of the internal mixer are discharged and, while still hot, roll-milled as quickly as possible on a roll to give a milled sheet. Test sheets are then cut out from this and are pressed for 10 min at temperatures of 250° C., above the melting point of the TPE, which is 220° C. The thickness of the test sheets is 2 mm or 6 mm, depending on the subsequent tests. All of the subsequent tests are carried out on these sheets. Tensile strain and stress are tested on 2 mm sheets and compression set is tested on 6 mm sheets.

The table below specifies the components used in the examples: thermoplastic, rubber, additives and co-crosslinking agents. The amounts used are stated in the table below in parts by weight unless otherwise mentioned.

Table 1 collates the physical properties of five thermoplastic elastomers of the invention:

TABLE 1

| Formulation (% by wt.) | | Ex. 1 | Ex. 2 | Ex. 3 | Ex. 4 | Ex. 5 |
|---|---|---|---|---|---|---|
| EVM rubber | Levapren 600[1)] | 100 | 100 | 100 | 90 | 90 |
| Compatibilizer | MAH_g_Lev 600[2)] | | | | 10 | 10 |
| COPE 1[3)] | Arnitel ® C[3)] | | | | 40 (27% by weight) | 40 (27% by weight) |
| COPE 2[4)] | Arnitel ® EM 550[4)] | 40 (27% by weight) | 50 (32% by weight) | 50 (32% by weight) | | |
| Peroxide | Trigonox ® 311[5)] | 2 | 2 | 2 | 1 | 1 |
| Co-cross-linking agent | TAIC[6)] | | | 1 | | 0.5 |
| Additives | Maglite ® DE[7)] | 2 | 2 | 2 | 2 | 2 |
| | Rhenogran ® PCD 50[8)] | 3 | 3 | 3 | 3 | 3 |
| Properties | Tensile strain (%) (ISO 37) | 638 | 692 | 370 | 473 | 398 |
| | Stress (MPa) (ISO 37) | 4 | 4 | 3.7 | 3.3 | 5 |
| | Shore A hardness (DIN 53505, ISO 868) | 57 | 66 | 64 | 61 | 64 |
| | Compression Set (125° C., 24 h, 25%) (ISO 815) | 77 | 81 | 66 | 75 | 60 |
| | Compression Set (150° C., 24 h, 25%) (ISO 815) | 72 | 84 | 71 | 82 | 68 |

[1)]Levapren ® 600: ethylene-vinyl acetate copolymer having 60 ± 1.5% by wt. of vinyl acetate from Lanxess Deutchland GmbH
[2)]MAH_g_Lev 600: Levapren ® 600, grafted with maleic anhydride; preparation is by analogy with Example 1 (process step 1 in EP 1 801 162 A1)
[3)]COPE 1: copolyester 1, Arnitel ® C; TPE-E from Royal DSM
[4)]COPE 2: copolyester 2, Arnitel ® EM 550; TPE-E from Royal DSM
[5)]Trigonox ® 311: 3,3,5,7,7-pentamethyl-1,2,4-trioxepane from Akzo Nobel Chemicals
[6)]TAIC: DIAK 7 triallyl isocyanurate from DuPont
[7)]Maglite ® DE: magnesium oxide from CP Hall Co
[8)]Rhenogran PCD 50: polycarbodiimide from Rhein Chemie Rheinau GmbH From the results shown in Table 1 it is apparent that all of the thermoplastic elastomers of the invention comply with the desired property profile. Comparison of Examples 1 and 2 of the invention shows that compression set and hardness (Shore A) are lower in the thermoplastic elastomers of the invention according to Example 1, in which the proportion of the copolyester is less than 30% by weight, than in the thermoplastic elastomers according to Example 2.

Comparison of Examples 2 and 3 of the invention, and also comparison of Examples 4 and 5 of the invention, shows that compression set can be reduced by addition of a co-crosslinking agent (TAIC).

The additives mentioned in the abovementioned examples are not essential in the thermoplastic elastomers, and serve to improve their processability. They do not have any substantial effect on the physical properties mentioned in Table 1 above.

What is claimed is:

1. A crosslinkable composition comprising
  a) from 5 to 90% by weight of at least one copolyester as thermoplastic elastomer, as component A;
  b) from 10 to 95% by weight, of at least one α-olefin-vinyl acetate copolymer having a vinyl acetate content of ≧50% by weight, as component B;
  c) from 0 to 30% by weight, of filler materials, plasticizers, additives and/or additions, as component C; where the entirety of components A, B and C is 100% by weight, and
  d) from 0.1 to 15 parts by weight per 100 parts by weight of the α-olefin-vinyl acetate copolymer (phr), of at least one peroxide as free-radical crosslinking initiator, as component D.

2. The composition according to claim 1 comprising
  a) from 10 to 80% by weight of at least one copolyester as thermoplastic elastomer, as component A;
  b) from 119.5 to 89.5% by weight of at least one α-olefin-vinyl acetate copolymer having a vinyl acetate content of ≧50% by weight as component B;
  c) from 0.5 to 25% by weight of filler materials, plasticizers, additives and/or additions, as component C; where the entirety of components A, B and C is 100% by weight, and
  d) from 0.5 to 7 parts by weight per 100 parts by weight of the α-olefin-vinyl acetate copolymer (phr) of at least one peroxide as free-radical crosslinking initiator, as component D.

3. The composition according to claim 1, comprising
  a) from 10 to 40% by weight of at least one copolyester as thermoplastic elastomer, as component A;

b) from 14.5 to 91.5% by weight of at least one α-olefin-vinyl acetate copolymer having a vinyl acetate content of ≧50% by weight as component B;
c) from 0.5 to 28% by weight of filler materials, plasticizers, additives and/or additions, as component C;
where the entirety of components A, B and C is 100% by weight, and
d) from 0.2 to 10 parts by weight per 100 parts by weight of the α-olefin-vinyl acetate copolymer (phr) of at least one peroxide as free-radical crosslinking initiator, as component D.

4. The composition according to claim 1, wherein the copolyester has, in the main chain of the polymer, monomer units which have linkage by way of ester groups (—C(=O)—O—).

5. The composition according to claim 1, wherein the copolyester in the form of a copolymer is a multiblock copolyester composed of hard blocks (X) based on aliphatic diols and on aromatic dicarboxylic acids, linked to soft block (Y) based on
  (i) at least one poly(alkylene oxide) glycol, and/or
  (ii) aliphatic diols and aliphatic dicarboxylic acids; and/or
  (iii) a triblock copolymer comprising an unhydrogenated or hydrogenated polyalkadiene block and two polyalkylene oxide blocks; and/or
  (iv) an aliphatic carbonate and, if appropriate, an aliphatic diol and an aliphatic carboxylic acid; or a lactone,
where the linkage of the blocks (X) and (Y) takes place by way of difunctional compounds.

6. The composition according to claim 5, characterized in that the copolyester is a multiblock copolyester composed of hard blocks (X), based on aliphatic diols selected from the group consisting of ethylene glycol, diethylene glycol, triethylene glycol, propylene glycol, butylene glycol, trimethylene glycol and cyclohexanedimethanol, preferably butylene glycol, and on aromatic dicarboxylic acids selected from the group consisting of phthalic acid, terephthalic acid and isophthalic acid, and of soft blocks (Y) based on at least one poly(alkylene oxide) glycol, where the poly(alkylene oxide) glycol is composed of $C_2$-$C_{10}$ poly(alkylene oxide) glycols, or on copolymers of the alkylene oxides mentioned.

7. The composition according to claim 1, wherein the α-olefin-vinyl acetate copolymer is an ethylene-vinyl acetate copolymer.

8. The composition according to claim 1, wherein peroxides are used which have crosslinking temperatures of ≧175° C.

9. The composition according to claim 1, wherein peroxides are used which have crosslinking temperatures of ≧185° C.

10. The composition according to claim 1, wherein peroxides are used which have crosslinking temperatures of ≧200° C.

11. The composition according to claim 1, wherein the compositions also comprise at least one co-crosslinking agent as component E.

12. The composition according to claim 11, wherein the co-crosslinking agent is selected from the group consisting of triallyl isocyanurate, N,N'-m-phenylenedimaleimide, triallyl cyanurate, liquid polybutadiene, trimethylolpropane-N,N'-m-phenylenemaleimide, N-methyl-N,N'-m-phenylenedimaleimide, divinylbenzene, polyfunctional methacrylate monomers, and polyfunctional vinyl monomers.

13. The composition according to claim 1, wherein the compositions also comprise at least one compatibilizer, as component F.

14. The composition according to claim 1, wherein the compatibilizer is a copolymer based on an α-olefin-vinyl acetate copolymer as main polymer chain, functionalized with carboxy groups, carbonyl groups, halogen atoms, amino groups, hydroxy group or oxazoline groups.

15. The composition according to claim 14, wherein the compatibilizer is obtained by means of grafting of α,β-ethylenically unsaturated mono- and/or dicarboxylic acids or their derivatives onto a main chain provided by an α-olefin-vinyl acetate copolymer.

16. A process for the preparation of compositions according to claim 1, comprising mixing components A, B, C and D which has been heated to temperatures above the highest melting or softening point of component A.

17. A process for the preparation of thermoplastic elastomers comprising the crosslinking of compositions according to claim 1, 11 or 13, or prepared according to claim 17 wherein the crosslinking of the disperse elastomer phase takes place during the mixing of components A to F.

18. A thermoplastic elastomer obtainable via crosslinking of compositions according to claim 1.

19. A thermoplastic elastomer comprising
  a) from 5 to 90% by weight of at least one copolyester as thermoplastic elastomer, as component A';
  b) from 10 to 95% by weight of at least one α-olefin-vinyl acetate copolymer having a vinyl acetate content of ≧50% by weight which has been crosslinked via at least one peroxide as free-radical crosslinking initiator as component B';
  c) from 0 to 30% by weight of filler materials, plasticizers, additives and/or additions, as component C;
  where the entirety of components A, B and C is 100% by weight.

20. The thermoplastic elastomer according to claim 19 comprising
  a) from 8 to 85% by weight f at least one copolyester as thermoplastic elastomer, as component A';
  b) from 14.5 to 91.5% by weight f at least one α-olefin-vinyl acetate copolymer having a vinyl acetate content of ≧50% by weight which has been crosslinked via at least one peroxide as free-radical crosslinking initiator as component B';
  c) from 0.5 to 28% by weight of filler materials, plasticizers, additives and/or additions, as component C;
  where the entirety of components A, B and C is 100% by weight.

21. The thermoplastic elastomer according to claim 19 comprising
  a) from 10 to 80% by weight of at least one copolyester as thermoplastic elastomer, as component A';
  b) from 19.5 to 89.5% by weight of at least one α-olefin-vinyl acetate copolymer having a vinyl acetate content of ≧50% by weight which has been crosslinked via at least one peroxide as free-radical crosslinking initiator as component B';
  c) from 0.5 to 25% by weight of filler materials, plasticizers, additives and/or additions, as component C;
  where the entirety of components A, B and C is 100% by weight.

22. The thermoplastic elastomer according to claim 19 comprising
  a) from 10 to <30% by weight, of at least one copolyester as thermoplastic elastomer, as component A';
  b) from >55 to 85% by weight, of at least one α-olefin-vinyl acetate copolymer having a vinyl acetate content of ≧50% by weight which has been crosslinked via at least one peroxide as free-radical crosslinking initiator as component B';

c) from 5 to 15% by weight of filler materials, plasticizers, additives and/or additions, as component C;

where the entirety of components A, B and C is 100% by weight.

23. The thermoplastic elastomer according to claim 18 in the form of or as part of mouldings.

24. The thermoplastic elastomer according to claim 23 in the form of or as part of drive belts, gaskets, sleeves, hoses, membranes, dampers, profiles, cable sheathing, hot-melting adhesives, foils, plastics-rubber coextruded articles, or for co-injection-mouldings.

25. The thermoplastic elastomer according to claim 19 in the form of or as part of mouldings.

* * * * *